US011354238B2

(12) United States Patent
Folliot et al.

(10) Patent No.: US 11,354,238 B2
(45) Date of Patent: Jun. 7, 2022

(54) METHOD AND DEVICE FOR DETERMINING MEMORY SIZE

(71) Applicant: STMicroelectronics (Rousset) SAS, Rousset (FR)

(72) Inventors: Laurent Folliot, Gourdon (FR); Pierre Demaj, Nice (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 122 days.

(21) Appl. No.: 16/691,957

(22) Filed: Nov. 22, 2019

(65) Prior Publication Data

US 2020/0183834 A1    Jun. 11, 2020

(30) Foreign Application Priority Data

Dec. 6, 2018 (FR) ..................... 1872443

(51) Int. Cl.
*G06N 3/04* (2006.01)
*G06F 12/02* (2006.01)
*G06F 12/06* (2006.01)

(52) U.S. Cl.
CPC ...... *G06F 12/0646* (2013.01); *G06F 12/0207* (2013.01); *G06F 12/0284* (2013.01); *G06N 3/04* (2013.01); *G06F 2212/1044* (2013.01)

(58) Field of Classification Search
CPC ........ G06F 12/0284; G06F 2212/1044; G06N 3/04
See application file for complete search history.

(56) References Cited

U.S. PATENT DOCUMENTS

| 2017/0161604 A1* | 6/2017 | Craddock ............ G06N 3/0454 |
| 2018/0088996 A1 | 3/2018 | Rossi et al. |
| 2018/0136912 A1 | 5/2018 | Venkataramani et al. |
| 2018/0285715 A1 | 10/2018 | Son et al. |
| 2019/0042925 A1 | 2/2019 | Choe et al. |

(Continued)

FOREIGN PATENT DOCUMENTS

| FR | 3089649 A1 | 6/2020 |
| WO | 2017129325 A1 | 8/2017 |

OTHER PUBLICATIONS

Siu, K., Stuart, D.M., Mahmoud, M., and A. Moshovos, "Memory Requirements for Convolutional Neural Network Hardware Accelerators," IEEE International Symposium on Workload Characterization (IISWC), 2018.*

(Continued)

*Primary Examiner* — Tracy A Warren
(74) *Attorney, Agent, or Firm* — Slater Matsil, LLP

(57) ABSTRACT

A method can be used to determine an overall memory size of a global memory area to be allocated in a memory intended to store input data and output data from each layer of a neural network. An elementary memory size of an elementary memory area intended to store the input data and the output data from the layer is determined for each layer. The elementary memory size is in the range between a memory size for the input data or output data from the layer and a size equal to the sum of the memory size for the input data and the memory size for the output data from the layer. The overall memory size is determined based on the elementary memory sizes associated with the layers. The global memory area contains all the elementary memory areas.

26 Claims, 6 Drawing Sheets

(56) References Cited

U.S. PATENT DOCUMENTS

2019/0156185 A1* 5/2019 Li .................... G06N 3/082
2019/0196970 A1* 6/2019 Han .................. G06N 3/063
2020/0183834 A1   6/2020 Folliot et al.
2020/0257972 A1* 8/2020 Miniskar ............ G06F 12/02

OTHER PUBLICATIONS

Erdeljan, Andrea, et al., "IP Core for Efficient Zero-Run Length Compression of CNN Feature Maps", 25th Telecommunications forum TELFOR 2017, Serbia, Belgrade, Nov. 21-22, 2017, 4 pages.

\* cited by examiner

METHOD AND DEVICE FOR DETERMINING MEMORY SIZE

CROSS-REFERENCE TO RELATED APPLICATIONS

This application claims priority to French Patent Application No. 1872443, filed on Dec. 6, 2018, which application is hereby incorporated herein by reference.

TECHNICAL FIELD

Embodiments of the invention and their implementation relate a method and device for determining a memory size.

BACKGROUND

Neural networks are widely used to solve various statistical problems, notably the problem of the classification of data.

After an automatic, generally supervised, learning phase, in other words on a reference database already classified, a neural network "learns" and becomes capable of applying on its own the same classification to unknown data.

Convolutional neural networks, or CNNs, may for example be mentioned, which are a type of neural network in which the connection pattern between the neurons is inspired by the visual cortex of animals. They allow the efficient recognition of objects or of persons in images or videos.

A convolutional neural network generally contains four types of layers successively processing the information: the convolution layer which for example processes blocks of the image one after the other; the non-linear layer which allows the relevance of the result to be improved; the "pooling" layer which allows several neurons to be grouped into a single neuron; and the "fully-connected" layer which connects all the neurons of a layer to all the neurons of the preceding layer.

Each layer takes data as input and, after processing by the layer, delivers output data (or "features") at the output.

The convolution layer generally corresponds to a scalar product between the neurons of the preceding layer and the weight of the neural network. It forms the first layer of a convolutional neural network.

"Weight", which is a term whose meaning in the field of neural networks is well known to those skilled in the art, is understood to mean neuron parameters that are configurable in order to obtain good output data or features.

The aim of the convolution layer is to identify the presence of a set of specific data in the images received at the input. For this purpose, a filtering by convolution is carried out. The principle is to scan a window representing the data to be detected, and to calculate the convolution product between the window and each portion of the image scanned.

Output data indicating where the specific data is situated on the image is obtained for each convolution product.

The pooling layer is often placed between two convolution layers. It receives at the input the data output from the convolution layer to which a "pooling" operation is applied, which consists in reducing the size of the data while at the same time preserving its important features. It allows the number of parameters and of calculations in the network to be reduced. The efficiency of the network is accordingly improved.

The fully-connected layer forms the last layer of a convolutional or non-convolutional neural network. It allows the input data of the neural network to be classified.

The typical architectures of neural networks stack a few pairs of convolution layers and non-linear layers then add a pooling layer and repeat this pattern until output data of a sufficiently small size is obtained, then terminate by two fully-connected layers.

Today, neural networks are increasingly complex and require a large amount of space in memory.

Several types of volatile memory are compatible with the use of a neural network: for example a TCM (for "Tightly-Coupled Memory") or an SRAM (for "Static Random Access Memory") or an external memory.

If the neural network needs a large memory, the system in which the neural network is implemented could combine several types of memory, for example the TCM memory with the external memory, slowing the execution time of the network.

SUMMARY

Embodiments of the invention and their implementation relate to deep learning, notably deep neural networks. Some embodiments relate to the determination of the overall memory size of a global memory area to be allocated in a memory intended to store input data and output data from each layer of a neural network.

Embodiments can help to limit as far as possible, or to optimize, the memory size needed for the execution of the neural network. The optimization of the memory size also leads to an optimization of the surface area of the system and to a reduction in its energy consumption during the execution of the neural network.

According to one aspect, a method is provided for determining the overall memory size of a global memory area to be allocated in a memory intended to store input data and output data from each layer of a neural network. The method includes, for each layer, a determination of an elementary memory size of an elementary memory area intended for input data and output data from the layer. The elementary size is in the range between the memory size for the input or output data from the layer and a size equal to the sum of the memory size for the input data and of the memory size for the output data from the layer. The overall memory size is determined based on the elementary memory sizes associated with the layers, the global memory area containing all the elementary memory areas.

The input and output data, for each layer, are stored in an elementary memory area whose size is determined. The elementary memory area is advantageously in the RAM memory.

The totality of the elementary memories represents a global memory area to be advantageously allocated in the RAM memory.

The optimization of the size of each elementary memory area leads to the optimization of the size of the global memory area.

According to one embodiment, for each layer, the determination of the elementary memory size and the positioning of the input data and of the output data depend at least on the type of the layer.

The determination of the elementary memory size and the positioning of the input data and of the output data may also depend on the memory size for the output data from the layer, and on its location in the elementary memory area.

In other words, depending on the type of the layer, for example a convolution layer, dense, non-linear or a pooling layer, on the location of the output data and on the memory size for these data, the positioning that requires the least amount of memory is chosen.

The elementary memory area may advantageously comprise, depending for example on the type of the layer or on the existing operations between two layers, an additional memory area preventing an overwrite of useful data in the elementary memory area. In this case, the size of the elementary memory area is less than or equal to the sum of the size of the input data and the output data of the layer since the output data are overlaid on the input data of the layer.

According to one embodiment, for at least one type of layer, at least a part of the output data is stored in the elementary memory area in place of at least a part of the input data, the elementary memory size being less than the size equal to the sum of the memory size for the input data and of the memory size for the output data from the layer. In particular, in this embodiment, the input data of the layer are not re-used by the following layers of the neural network. They can thus be overwritten by the output data of the layer.

According to one embodiment, for at least another type of layer, the elementary memory size is equal to the size of the sum of the memory size for the input data and of the memory size for the output data from the layer, the output data and the input data being juxtaposed in the corresponding memory area.

According to one embodiment, the determination of the overall memory size comprises successive updates of a current value of the memory size based on elementary memory sizes successively determined for the successive layers of the neural network, the value of the overall memory size being the latest updated current value at the end of all the successive updates.

In other words, at each layer, after determination of the size of the elementary memory area, an update of a current value is carried out representing the size of the elementary memory. Once the size of all the elementary memory areas has been determined, the overall memory size will take the value of the current value.

According to one embodiment, the first value of the memory size is the elementary memory size of the elementary memory area associated with the first layer, and for each current layer, the current value of updated memory size is the elementary memory size of the elementary memory area associated with the current layer if this elementary memory size is greater than the preceding value of the memory size, or remains the preceding value of the memory size if this elementary memory size is less than or equal to this preceding value of the memory size.

According to one embodiment, the method furthermore comprises, for each layer, an update of the relative address of the elementary memory area associated with the layer.

Each elementary memory area is advantageously stored in the RAM memory which comprises addresses.

The term "relative address" refers to the offset in memory with respect to the next elementary memory area to be stored.

According to one embodiment, the method comprises, for each layer, a determination of the absolute address of the elementary memory area associated with the layer.

The term "absolute address" is understood to mean the address of the location of the elementary memory area in the memory intended for storing the input and output data from the neural network.

Thus, the method according to this aspect allows, for example, for a given neural network, the optimization of the memory size to be allocated, and the absolute and relative addresses of each area of elementary memory allocated to each of the layers of the neural network to be obtained for this memory.

According to another aspect, a device comprises an input intended to receive parameters defining the various successive layers of a neural network. A processor is coupled to the input and is designed to determine the overall memory size of a global memory area to be allocated in a memory intended to store input data and output data from each layer of the neural network. The processor is configured for determining, for each layer, an elementary memory size of an elementary memory area intended to store input data and output data from the layer. The elementary size is in the range between the memory size for the input or output data from the layer and a size equal to the sum of the memory size for the input data and of the memory size for the output data from the layer. The overall memory size is determined based on the elementary memory sizes associated with the layers. The global memory area is configured to contain all the elementary memory areas.

According to one embodiment, for each layer, the processor is configured for determining the elementary memory size and the positioning of the input data and of the output data according at least to the type of the layer.

The processor may also be configured for determining the elementary memory size and the positioning of the input data and of the output data as a function of the memory size for the output data from the layer, and of their location in the elementary memory area.

According to one embodiment, for at least one type of layer, at least a part of the output data is intended to be stored in the elementary memory area in place of at least a part of the input data, the elementary memory size being less than the size equal to the sum of the memory size for the input data and of the memory size for the output data of the layer.

According to one embodiment, for at least another type of layer, the elementary memory size is equal to the size of the sum of the memory size for the input data and of the memory size for the output data of the layer, the output data and the input data being intended to be juxtaposed in the corresponding elementary memory area.

According to one embodiment, the processor is configured for determining the overall memory size by successive updates of a current value of memory size based on the elementary memory sizes successively determined by the successive layers of the neural network, the value of the overall memory size being the latest updated current value at the end of all the successive updates.

According to one embodiment, the first value of memory size is the elementary memory size of the elementary memory area associated with the first layer, and for each current layer, the processor is configured for updating the current value of memory size with the elementary memory size of the elementary memory area associated with the current layer if this elementary memory size is greater than the preceding value of the memory size, or with the preceding value of the memory size if the size of the elementary memory is less than or equal to this preceding value of the memory size.

According to one embodiment, the processor is configured for furthermore carrying out, for each layer, an update of the relative address of the elementary memory area associated with the layer.

According to one embodiment, the processor is configured for furthermore carrying out, for each layer, a determination of the absolute address of the elementary memory area associated with the layer.

According to another aspect, a microcontroller is also provided comprising the device such as defined hereinbefore.

BRIEF DESCRIPTION OF THE DRAWINGS

Other advantages and features of the invention will become apparent upon reading the detailed description of embodiments and of their implementation, which are in no way limiting, and from the appended drawings in which.

DETAILED DESCRIPTION OF ILLUSTRATIVE EMBODIMENTS

Figure 1:
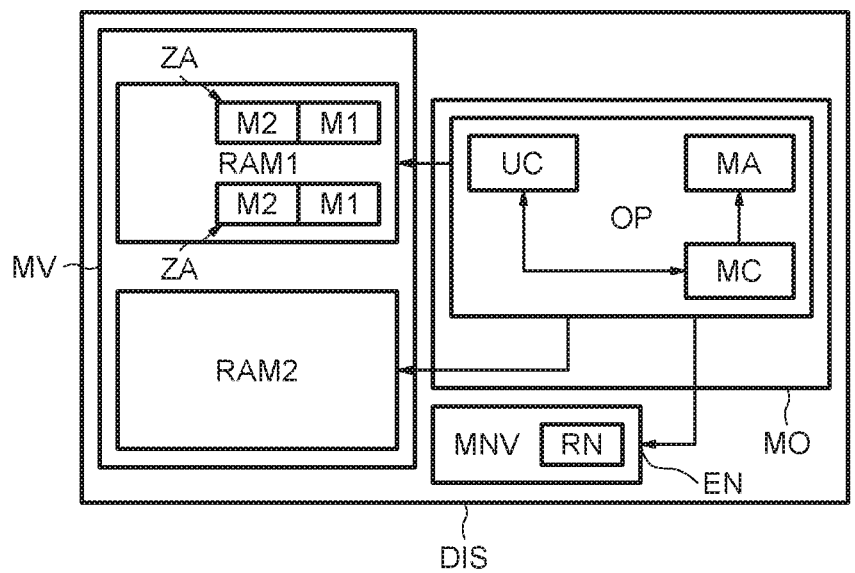
FIG. 1 illustrates schematically one embodiment of the invention.

In FIG. 1, the reference DIS denotes a device for example a microcontroller, a code generator or any other object that may contain an onboard software or hardware architecture.

The device comprises a volatile memory MV for example a RAM memory (for "Random Access Memory"). Here, the volatile memory MV comprises a first memory RAM1 and a second memory RAM2.

It is understood that the volatile memory may comprise more than two memories.

The device DIS also comprises a non-volatile memory MNV comprising an input EN intended to receive the various parameters defining the architecture of a neural network RN, in other words the configuration of its layers and its weights.

The volatile memory MV is configured for storing the input data M1 and the output data M2 from each layer in one of the two memories RAM1 and RAM2, the input and output data from the layer in question being intended to occupy one elementary memory area ZA.

The device DIS comprises a module MO configured for carrying out given actions.

The module MO comprises a processor OP configured for determining the size of a global memory area to be allocated comprising all of the elementary memory areas ZA in the volatile memory MV. For this purpose, the processor OP is coupled to the two memories RAM1 and RAM2, and is configured for determining, for each layer of the neural network, the elementary memory size of the elementary memory area ZA associated with the layer.

The processor OP comprises a processing unit UC, a controller MC and an allocation circuit MA.

The processor OP is coupled to the non-volatile memory MNV via the input EN so as to enable the processing unit UC to obtain the parameters relating to the layers and to the operations of the neural network.

The processing unit UC comprises for example a microprocessor configured for performing the calculations necessary for the determination of the elementary memory size of the elementary memory area ZA.

The processing unit UC is configured for sending the results of the calculations to the controller MC configured for choosing, as a function of the type of the layer and/or the memory size for the output data M2 and/or of their location in the elementary memory area ZA, the positioning of the data from the input data M1 and from the output data M2, the elementary memory size of the elementary memory area ZA and the size of the global memory area to be allocated comprising all of the elementary memory areas ZA.

The controller MC is coupled to the allocation circuit MA, which is configured for allocating the global memory area comprising all of the elementary memory areas ZA after authorization of the controller MC.

The controller and the allocation circuit may for example be implemented by software modules within the microprocessor and/or by specific logic circuits.

Figure 2:
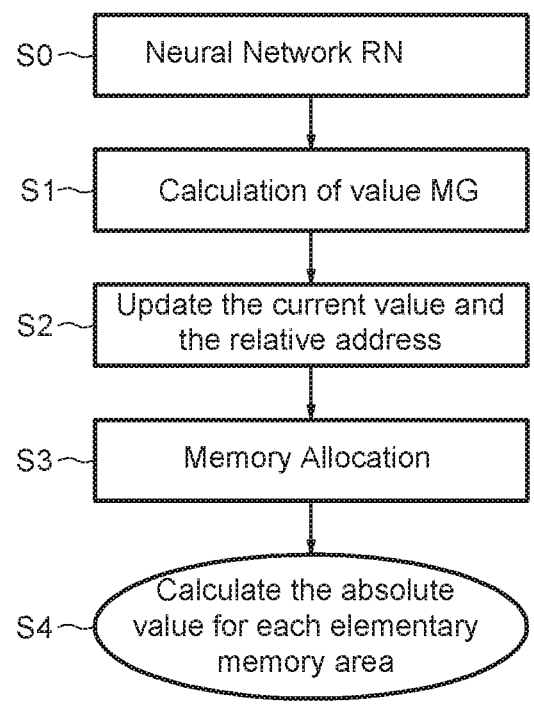
FIG. 2 illustrates schematically one embodiment of the invention.

FIG. 2 shows a flow diagram of the various steps leading to the determination and to the allocation of the size of the global memory area comprising all of the elementary memory areas ZA.

The step S0 comprises the receipt of the architecture of the neural network RN via the input EN in order to be stored in the non-volatile memory MNV.

The controller MC is configured for extracting the architecture, in other words the configuration of the layers, of the operations between the layers and of the weights of the neural network RN.

The controller MC is subsequently configured for sending the configuration of each layer to the processing unit UC configured for calculating a value MG associated with the type of the layer and/or with the operation carried out between two layers in the step S1. The calculation will be detailed in FIG. 3.

The value MG allows the possible positionings of the input data M1 and of the output data M2 from the layer to be determined.

In the step S2, the controller MC subsequently chooses the positioning requiring the least amount of memory space and updates a current value of the memory size if the current value is greater than the elementary memory size of a previous elementary memory area ZA.

In the step S2, the controller MC also updates the relative address of the elementary memory area ZA associated with the layer.

The step S1 is repeated for all the layers of the neural network RN.

The step S2 is also repeated for all the layers of the neural network RN once the step S1 is finished.

The current final value represents the overall memory size of the global memory area to be allocated.

In the step S3, the controller MC authorizes the allocation circuit MA to allocate the global memory area having a size equal to the current final value.

Once the block of the global memory area has been allocated, the processing unit UC is configured for calculating the absolute addresses of each elementary memory area ZA. The calculation is detailed in FIG. 4.

Figure 3:
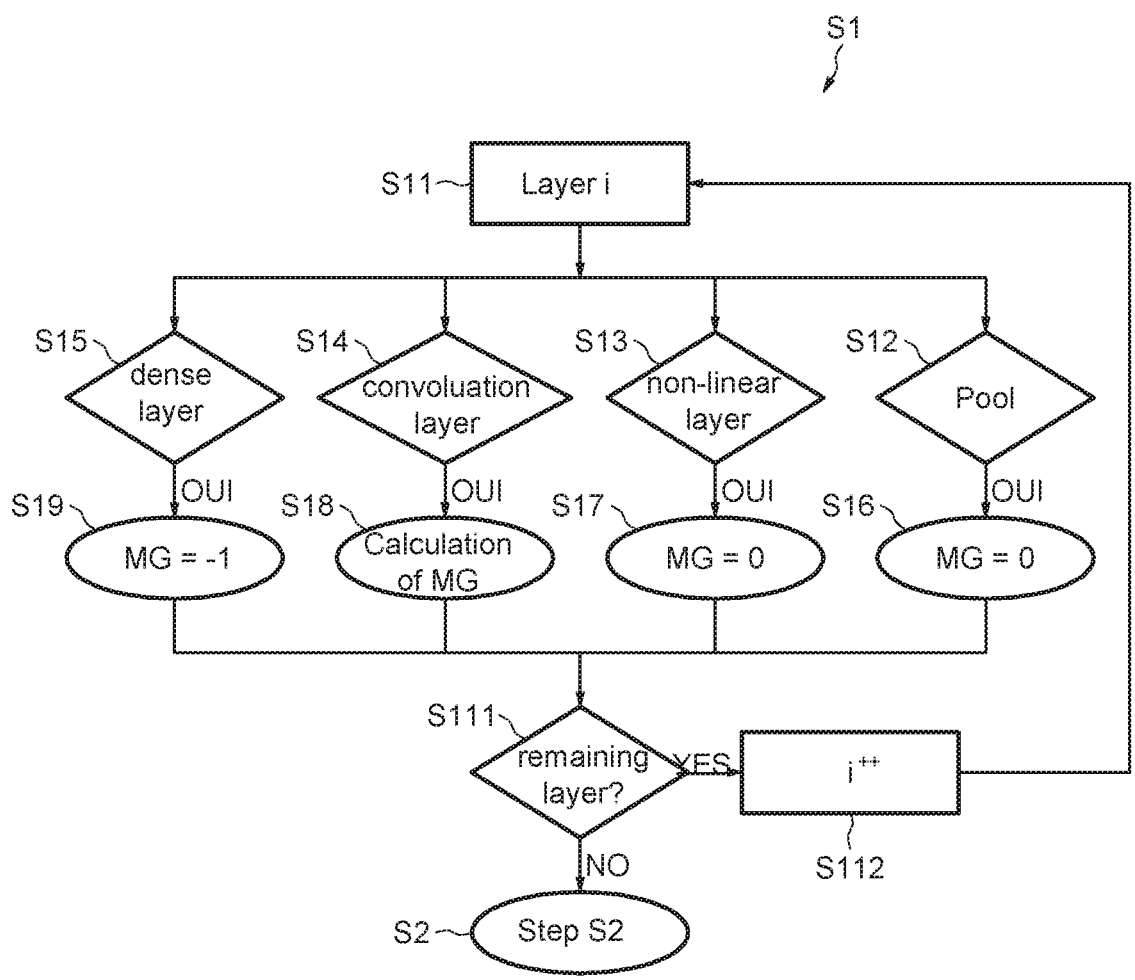
FIG. 3 illustrates schematically one embodiment of the invention.

FIG. 3 illustrates a detailed flow diagram of the step S1.

In the step S11, the configuration of each layer i of the neural network RN is sent to the processing unit UC.

If the layer i is a dense layer (S15), the value MG will be equal to −1 in S19.

If the layer i is a convolution layer (S14), the value MG is calculated. It may be negative, positive or equal to 0 in S16. The value MG is for example calculated according to the formula hereinbelow:

$$MG=(CEIL(CONV1\_PADX+1,CONV1\_STRIDEX)+ CONV1\_OUT\_DIM\_X \times CEIL(CONV1\_PADY+ 1,CONV1\_STRIDEY)) \times CONV1\_OUT\_CH).$$

CEIL is a function which allows a number to be rounded up to the next higher integer number.

CONV1_PADX+1 is a variable which represents the number of zeros added horizontally starting from the left.

CONV1_STRIDEX is a variable which represents the horizontal displacement pitch of the convolution core.

CONV1_OUT_DIM_X is a variable which represents the size of the output data.

CONV1_PADY+1 represents the number of zeros added vertically starting from the top.

CONV1_STRIDEY represents the vertical displacement pitch of the convolution core.

CONV1_OUT_CH represents the number of output channels.

If the layer i is a non-linear layer (S13), the value MG is equal to 0 in S17, and if the layer is a pooling layer (S12), the value MG is also equal to 0 in S16.

The layer i may also be a "Soft Max" layer known to those skilled in the art. In this case, the value MG is also equal to 0. The controller MC verifies, in the step S111, whether there are still layers of the neural network RN remaining to be processed. If yes, in the step S112, the controller MC authorizes the processing unit UC to extract the configuration of one of the remaining layers. If no, the method goes to the step S2.

If the operation carried out between two successive layers is recognized by the processing unit UC, the processing unit UC calculates the value MG.

For example, if the operation is a floating point to fixed point conversion, the value MG is equal to 0, and if the operation is a fixed point to floating point conversion, the value MG is equal to three times the memory size for the input data in fixed point mode.

Those skilled in the art will be able to determine MG for other types of operations considered as recognized by the processing unit.

If the operation is considered as non-recognized by the processing unit, the value of MG is equal to −1.

Figure 4:
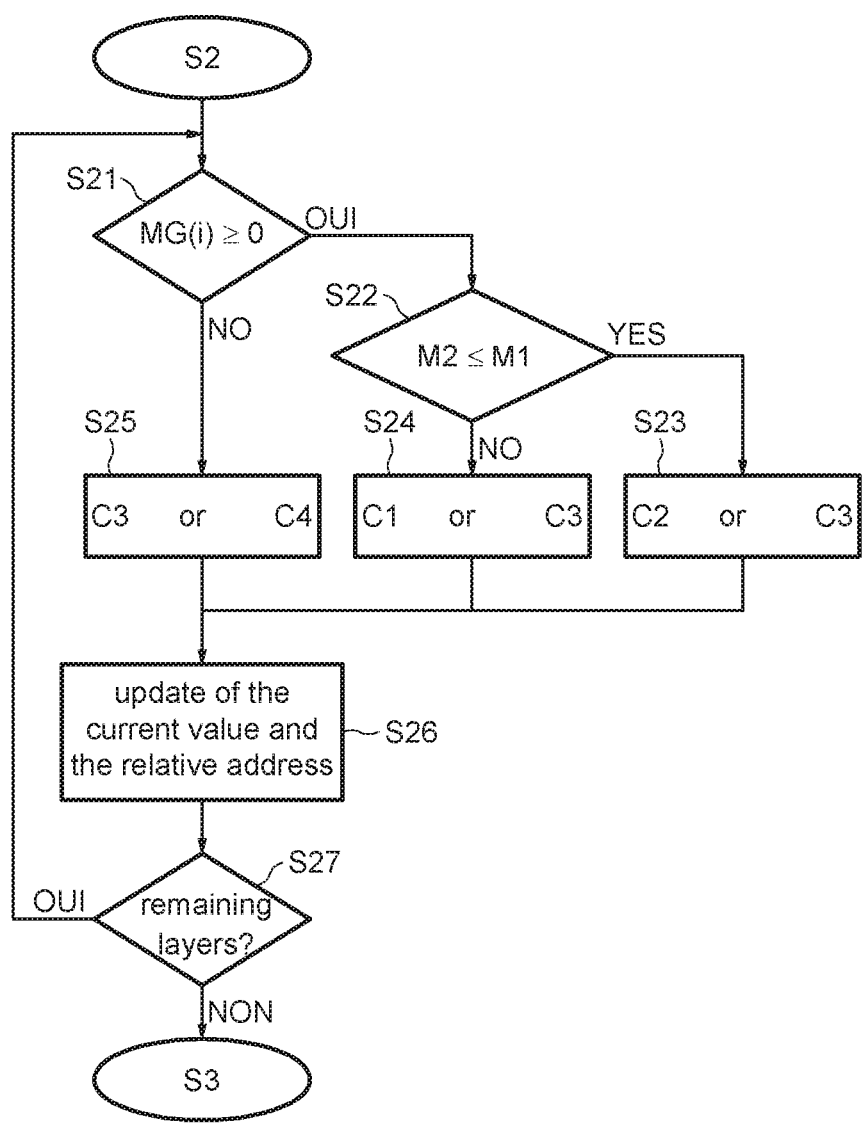
FIG. 4 illustrates schematically one embodiment of the invention.

FIG. 4 illustrates a detailed flow diagram of the step S2.

For each layer i, if the calculated value MG is less than 0 (S21), the controller MC determines two possible positionings C3 and C4 at the step S25 for the input data M1 and for the output data M2.

In the case where the value of MG is greater than or equal to 0, the controller MC compares the size of the input data M1 to the size of the output data M2 in the step S22.

If the size of the output data M2 is less than or equal to the size of the input data M1, the controller MC determines, at the step S23, two possible positionings C2 and C3 for the input data M1 and for the output data M2.

If the size of the output data M2 is greater than the size of the input data M1, the controller MC determines, at the step S24, two possible positionings C1 and C3 for the input data M1 and for the output data M2.

The controller MC subsequently chooses, from the possible positionings, the positioning requiring the least amount of memory space.

In the step S26, it subsequently carries out the update of the current value corresponding to the elementary memory size of the elementary memory area ZA or the sum of the elementary memory size and of the additional memory size of the elementary memory area ZA if the current value is greater than a current value associated with the preceding layer.

The controller MC also defines the relative address of the elementary memory area ZA.

At the step S27, the controller MC verifies whether there are still layers remaining to be processed. If yes, the controller MC processes the next layer and if no, the method goes to the next step S3 where the controller MC gives the authorization to the allocation circuit MA to allocate the global memory area with a size equal to the latest updated current value.

Figure 5:
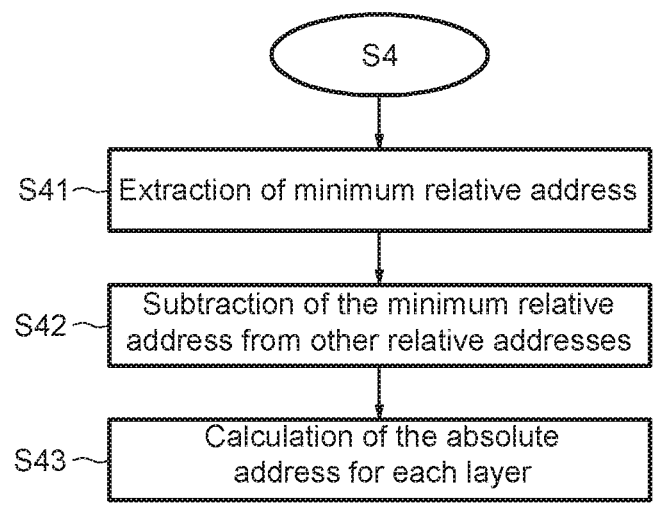
FIG. 5 illustrates schematically one embodiment of the invention.

FIG. 5 illustrates a flow diagram detailing the step S4 comprising the calculation of the absolute addresses of each elementary memory area ZA.

For this purpose, the controller MC determines the minimum relative address amongst the relative addresses of all the elementary memory areas ZA in the step S41 then subtracts the minimum value from the other relative addresses of the other elementary memory areas ZA, in the step S42, so as to generate positive relative addresses.

In the step S43, the processing unit UC subsequently generates, for each layer, an absolute address taking into account the positive relative address and the absolute address of the global memory area.

Figure 6A:
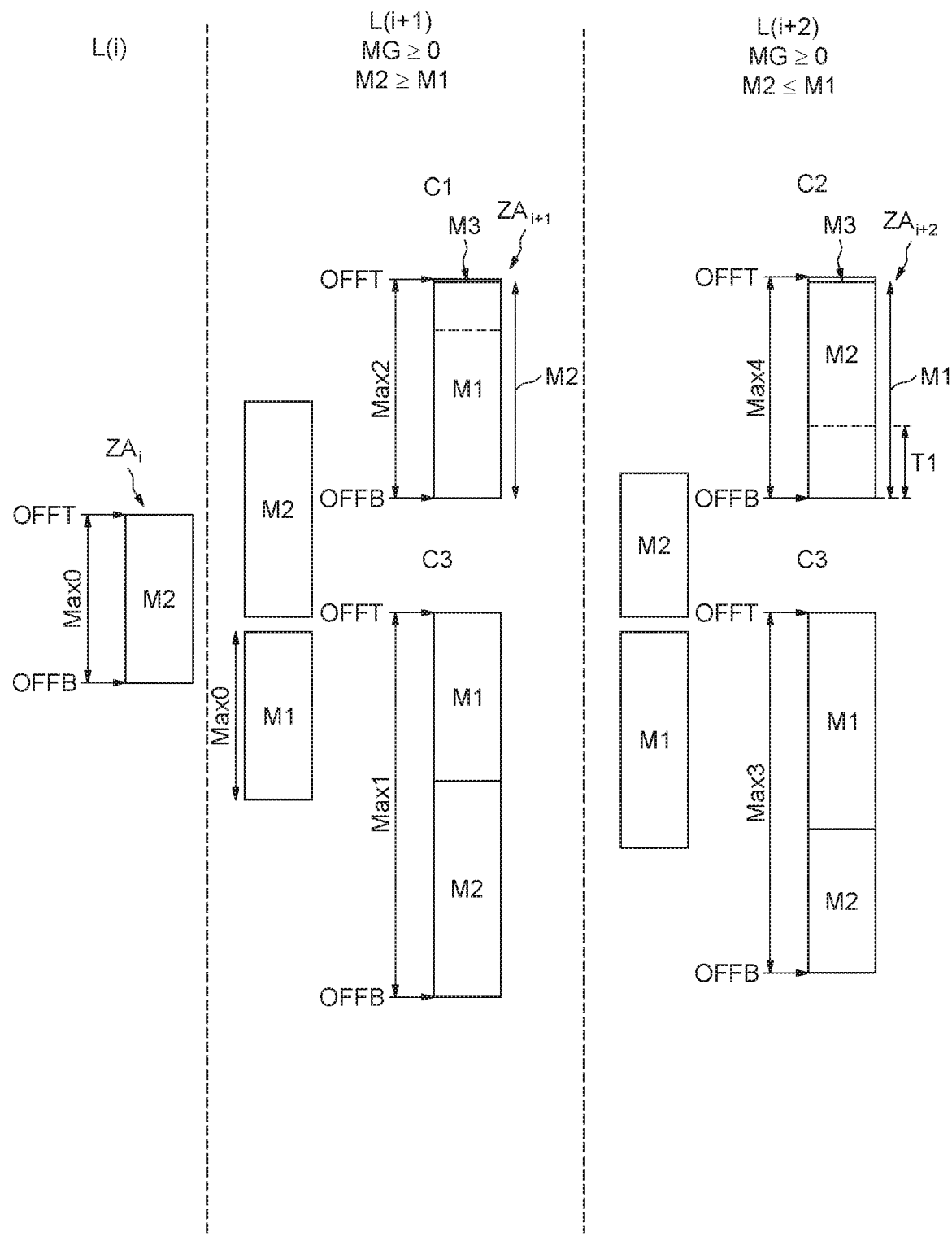
FIG. 6A illustrates schematically one embodiment of the invention.

FIG. 6A illustrates the steps S2 and S3 for the first layer L(i), the second layer L(i+1) and the third layer L(i+2) of the neural network RN.

The first layer L(i) of the neural network RN is associated with a first elementary memory area ZAi having an elementary memory size Max0 and a relative address represented by two pointers OFFB and OFFT bounding the elementary memory area ZAi.

The elementary memory area ZAi comprises the output data M2.

The output data M2 of the layer L(i) represent the input data M1 of the second layer L(i+1). The data M2 of the layer L(i+1) represent the output data of the layer L(i+1).

The second layer L(i+1) is for example a convolution layer. Its calculated value MG here is greater than 0. There may for example be an operation to be performed between two successive layers, for example L(i) and L(i+1). In this case, the value MG is calculated according to the nature of the operation as explained hereinbefore.

Given that the size of the output data M2 of the layer L(i+1) is greater than the size of the input data M1 of the layer L(i+1), the two possible positionings of the input data M1 and of the output data M2 are C1 and C3.

In the positioning C1, the output data M2 of the layer L(i+1) overlay the input data M1 of the layer L(i+1). In particular, the input data M1 of the layer L(i+1) are overwritten by the output data M2 of the layer L(i+1) once these latter are calculated. In particular, the input data M1 of the layer L(i+1) may be overwritten since they are not re-used by the following layers of the neural network RN. An additional memory area having a memory size M3 is also provided to avoid an overwrite of useful data in the elementary memory area of the layer L(i+1). The calculated value MG represents the size of the additional memory M3.

In the positioning C3, the input data M1 of the layer L(i+1) and the output data M2 of the layer L(i+1) are kept.

In this example, the size Max2 of the positioning C1 is less than the size Max1 of the positioning C3. The controller MC therefore chooses the positioning C1 in which a part of the output data M2 is stored in place of a part of the input data M1. Nevertheless, in other examples, the size of the additional memory M3 could be greater than the memory size of the input data M1. The positioning C3 would thus be chosen.

In the illustrated example, the input data M1 and the output data M2 of the layer L(i+1) thus placed occupy the elementary memory area ZAi+1 whose elementary memory size is equal to the memory size of the output data M2. The size of the elementary memory area ZAi+1 is thus equal to the sum of the elementary memory size and the additional memory size. In this case, the size of the elementary memory area ZAi+1 is less than or equal to the sum of the size of the input data M1 and the output data M2 of the layer L(i+1).

The controller MC updates the relative address OFF, OFFT of the elementary memory area ZAi+1 and the current value of the memory size, which henceforth has the value Max2, since the value Max2 is greater than the value Max0.

The third layer L(i+2) is for example a convolution layer. In this case, the value MG calculated by the processing unit UC is greater than 0.

The output data M2 of the layer L(i+1) represent the input data M1 of the next layer L(i+2). The data M2 of the layer L(i+2) represent the output data of the layer L(i+2).

Given that the size of the output data M2 is less than the size Max2 of the input data M1, the two possible positionings of the input data M1 and of the output data M2 are C2 and C3.

In the positioning C2, the output data M2 of the layer L(i+2) overlay a portion of the input data M1 of the layer L(i+2). In particular, a portion of the input data M1 of the layer L(i+2) are overwritten by the output data M2 of the layer L(i+2) once these latter are calculated. An additional memory area having a memory size M3 is also provided to prevent an overwrite of useful data in the elementary memory area of the layer L(i+1). The calculated value MG represents an additional memory size M3.

In the positioning C3, the input data M1 of the layer L(i+2) and the output data M2 of the layer L(i+2) are kept.

In this example, the size Max4 of the positioning C2 is less than the size Max3 of the positioning C3. The controller MC therefore chooses the positioning C2 in which a part of the output data M2 is stored in place of a part of the input data M1. Nevertheless, in other examples, the size of the additional memory M3 could be greater than the memory size of the output data M2. The positioning C3 would thus be chosen.

In the illustrated example, the input data M1 and the output data M2 thus placed occupy the elementary memory area ZAi+2 whose elementary memory size is equal to the memory size for the output data M1. The size of the elementary memory area ZAi+2 is thus equal to the sum of the elementary memory size and the additional memory size.

The controller MC updates the relative address OFFB, OFFT of the elementary memory area ZAi+2 and the current value of the memory size which henceforth has the value Max4.

Figure 6B:
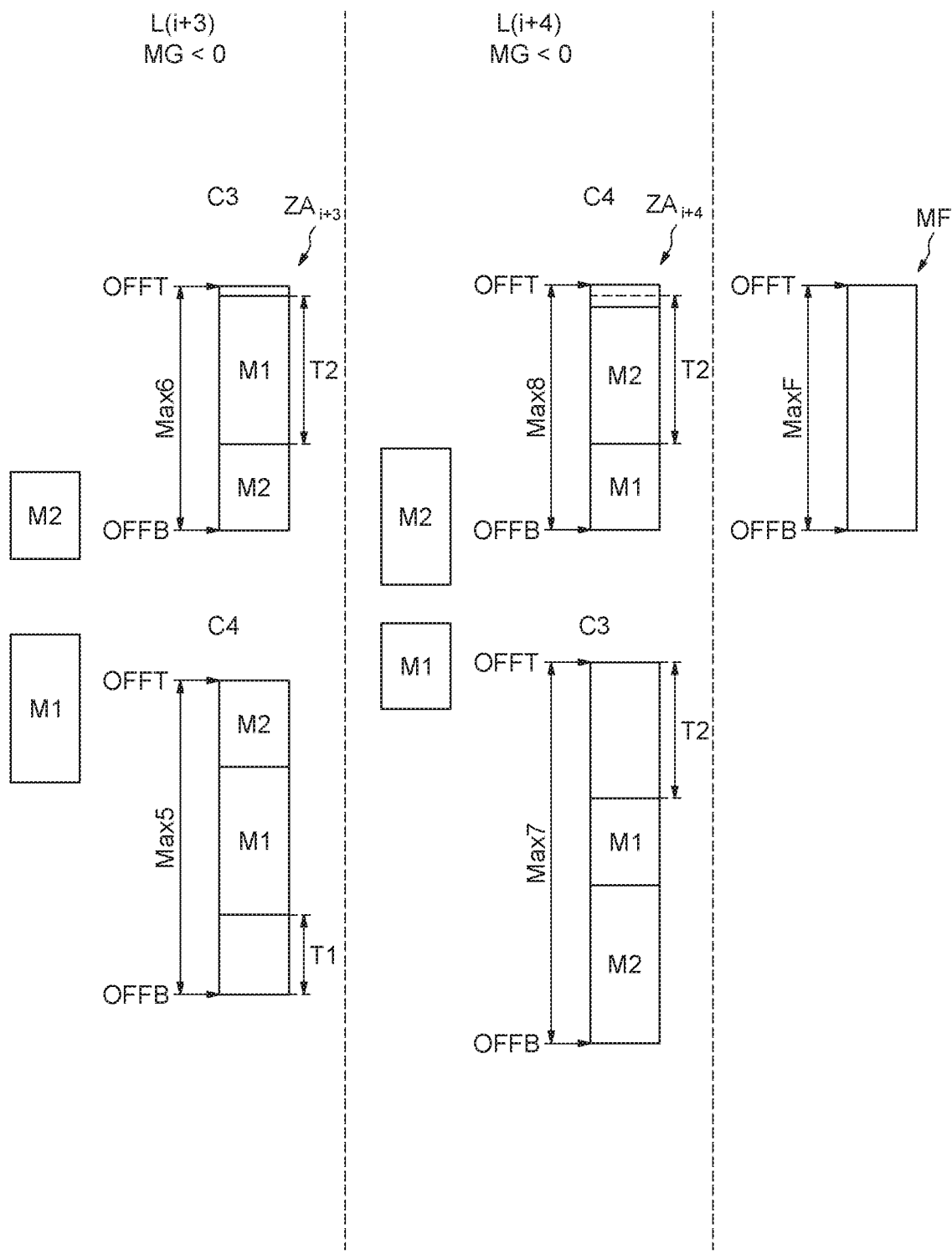
FIG. 6B illustrates schematically one embodiment of the invention.

FIG. 6B illustrates the steps S2 and S3 for the fourth layer L(i+3) and the last layer L(i+4) of the neural network RN.

The fourth layer L(i+3) is for example a dense layer. Its calculated value MG is therefore equal to −1.

The output data M2 of the layer L(i+2) represent the input data M1 of the next layer L(i+3). The data M2 of the layer L(i+3) represent the output data of the layer L(i+3).

As MG is equal to −1, it is not possible to overlay the output data M2 of the layer L(i+3) on the input data M1 of layer L(i+3).

The two possible positionings of the input data M1 and of the output data M2 are C3 and C4.

In the positioning C3, the output data M2 of the layer L(i+3) overlay a portion T1 of the elementary memory area of the layer L(i+2) not having the output data M2 of the layer L(i+2) (that is to say, the input data M1 of the layer L(i+3)). In particular, this portion T1 of the elementary memory area of the layer L(i+2) is overwritten by the output data M2 of the layer L(i+3) once these latter are calculated.

In the positioning C4, the input data M1 of the layer L(i+3), the output data M2 of the layer L(i+3) and the portion T1 of the elementary memory area of the layer L(i+2) are kept.

In this example, the size Max6 of the positioning C3, in which the input data M1 and the output data M2 are juxtaposed, is less than the size Max5 of the positioning C4.

The controller MC therefore chooses the positioning C3.

The input data M1 and the output data M2 thus placed occupy the elementary memory area ZAi+3 whose elementary memory size is equal to the sum of the memory size for the output data M2 and of the memory size for the input data M1.

The controller MC updates the relative address OFFB, OFFT of the elementary memory area ZAi+3 and the current value of the memory size which henceforth has the value Max6.

The last layer L(i+4) is for example a dense layer. Its calculated value MG is therefore equal to −1.

The output data M2 of the layer L(i+3) represent the input data M1 of the next layer L(i+4). The data M2 of the layer L(i+4) represent the output data of the layer L(i+4).

As MG is equal to −1, it is not possible to overlay the output data M2 of the layer L(i+4) on the input data M1 of the layer L(i+4).

The two possible positionings of the input data M1 and of the output data M2 are C3 and C4.

In the positioning C3, the output data M2 of the layer L(i+4) overlay a portion T2 of the elementary memory area of the layer L(i+3) comprising the input data M1 of the layer L(i+3). In particular, this portion T2 of the elementary memory area of the layer L(i+3) is at least partially overwritten by the output data M2 of the layer L(i+4) once they are calculated.

In the positioning C4, the input data M1 of the layer L(i+4), the output data M2 of the layer L(i+4) and the portion T2 of the elementary memory area of the layer L(i+3) are kept.

In this example, the size Max8 of the positioning C4, in which the input data M1 and the output data M2 are juxtaposed, is less than the size Max7 of the positioning C3.

The controller MC therefore chooses the positioning C4.

The input data M1 and the output data M2 thus placed occupy the elementary memory area ZAi+4 whose elementary memory size is equal to the sum of the memory size for the output data M2 and of the memory size for the input data M1.

The controller MC updates the relative address OFFB, OFFT of the elementary memory area ZAi+4 and the current value of the memory size which has the value Max8.

The controller MC subsequently authorizes the allocation circuit MA to allocate a global memory area MF of size Max8.

What is claimed is:

1. A method for determining an overall memory size of a global memory area to be allocated in a memory intended to store input data and output data from each layer of a neural network, the method comprising:
   for each layer of the neural network, determining a value indicative of whether additional memory can be added to the memory, the value representing a size of the additional memory that can be added;
   in response to determining, based on the value, that additional memory can be added to the memory,
   comparing a memory size of the input data and a memory size of the output data from the layer, and
   determining possible positionings of the input data and the output data from the layer based on the value and the comparing of the memory size; and
   for each layer, determining an elementary memory size of an elementary memory area intended to store the input data and the output data from the layer based on a size of a selected positioning, the elementary memory size being in a range between the memory size for the input data or output data from the layer and a size equal to the sum of the memory size for the input data and the memory size for the output data from the layer, the overall memory size being determined based on the elementary memory sizes associated with the layers, the global memory area containing all the elementary memory areas.

2. The method according to claim 1, wherein, for each layer, the value is determined based on a type of the layer or is determined based on an operation carried out between two successive layers of the neural network.

3. The method according to claim 2, wherein, for at least one type of layer, at least a part of the output data is stored in the elementary memory area in place of at least a part of the input data so that the elementary memory size is less than the size equal to the sum of the memory size for the input data and of the memory size for the output data from the layer.

4. The method according to claim 3, wherein, for at least another type of layer, the elementary memory size is equal to the sum of the memory size for the input data and of the memory size for the output data from the layer.

5. The method according to claim 4, wherein the output data and the input data are juxtaposed in a corresponding memory area.

6. The method according to claim 1, wherein determining the overall memory size comprises performing successive updates of a current value of memory size based on elementary memory sizes successively determined for successive layers of the neural network, the value of the overall memory size being the latest updated current value at the end of all the successive updates.

7. The method according to claim 6, wherein a first value of memory size is the elementary memory size of the elementary memory area associated with a first layer, and for each current layer, the current value of updated memory size is the elementary memory size of the elementary memory area associated with the current layer when this elementary memory size is greater than a preceding value of the memory size, or remains the preceding value of the memory size when this elementary memory size is less than or equal to this preceding value of the memory size.

8. The method according to claim 6, further comprising, for each layer, updating a relative address elementary memory area associated with the layer.

9. The method according to claim 6, comprising, for each layer, determining an absolute address of the elementary memory area associated with the layer.

10. A device, comprising: an input configured to receive parameters defining various successive layers of a neural network; and
   a processor coupled to the input and configured to determine an overall memory size of a global memory area to be allocated in a memory intended to store input data and output data from each layer of the neural network, the processor being configured to:
   determine, for each layer, a value indicative of whether additional memory can be added to the memory, the value representing a size of the additional memory that can be added;
   in response to determining, based on the value, that additional memory can be added to the memory,
   compare a memory size of the input data and a memory size of the output data from the layer, and
   determine possible positionings of the input data and the output data from the layer based on the value and the comparing of the memory size; and
   determine, for each layer, an elementary memory size of an elementary memory area intended to store the input data and the output data from the layer based on a size of a selected positioning, the elementary size being in a range between the memory size for the input data or the output data from the layer and a size equal to the sum of the memory size for the input data and the memory size for the output data from the layer, the overall memory size being determined based on elementary memory sizes associated with the layers, the global memory area being configured so as to contain all the elementary memory areas.

11. The device according to claim 10, wherein, for each layer, the processor is configured to determine the value based on a type of the layer or based on an operation carried out between two successive layers of the neural network.

12. The device according to claim 11, wherein, for at least one type of layer, at least a part of the output data is intended to be stored in the elementary memory area in place of at least a part of the input data so that the elementary memory size is less than the sum of the memory size for the input data and of the memory size for the output data from the layer.

13. The device according to claim 12, wherein, for at least another type of layer, the elementary memory size is equal to the size of the sum of the memory size for the input data and of the memory size for the output data from the layer, the output data and the input data intended to be juxtaposed in a corresponding elementary memory area.

14. The device according to claim 10, wherein the processor is configured to determine the overall memory size by successive updates of a current value of memory size based on elementary memory sizes successively determined by successive layers of the neural network, the value of the overall memory size being the latest updated current value at the end of all the successive updates.

15. The device according to claim 14, wherein a first value of memory size is the elementary memory size of the elementary memory area associated with a first layer and, for each current layer, the processor is configured to update the current value of memory size with the elementary memory size of the elementary memory area associated with the current layer if this elementary memory size is greater than a preceding value of the memory size, or with the preceding value of the memory size if this elementary memory size is less than or equal to this preceding value of the memory size.

16. The device according to claim 14, wherein the processor is further configured to carry out, for each layer, an update of a relative address of the elementary memory area associated with the layer.

17. The device according to claim 14, wherein the processor is configured to furthermore carry out, for each layer, a determination of an absolute address of the elementary memory area associated with the layer.

18. The device according to claim 10, wherein the device is a microcontroller.

19. The device of claim 10, further comprising:
the memory for storing input data and output data of the neural network;
a program memory storing instructions; and
the processor coupled to the program memory and configured to execute the instructions to determine the overall memory size of the global memory area to be allocated in the memory to store the input data and the output data from each layer of the neural network.

20. The method according to claim 1, wherein determining the value indicative of whether additional memory can be added to the memory comprises: determining whether the value is greater than or equal to zero; in response to determining that the value is greater than or equal to zero, determining that the output data can overlay the input data and the value represents a size of the additional memory required to be added to the memory to avoid overwrite of useful data in the elementary memory area when the output data overlays the input data; and in response to determining that the value is less than zero, determining that the output data cannot overlay the input data and additional memory cannot be added to the memory after storing the data from the layer.

21. The device according to claim 10, wherein processor is configured to determine the value indicative of whether additional memory can be added to the memory by determining whether the value is greater than or equal to zero; in response to determining that the value is greater than or equal to zero, determining that the output data can overlay the input data and the value represents a size of the additional memory required to be added to the memory to avoid overwrite of useful data in the elementary memory area when the output data overlays the input data; and in response to determining that the value is less than zero, determining that the output data cannot overlay the input data and additional memory cannot be added to the memory after storing the data from the layer.

22. The method of claim 1, further comprising determining possible positionings of the input data and the output data from the layer based on the value in response to determining that additional memory cannot be added to the memory.

23. The method of claim 1, wherein the neural network is a convolutional neural network, and wherein, for each layer, the value is determined based on a type of the layer of the convolutional neural network, the type of the layer being one of convolution, non-linear, pooling, and fully-connected.

24. The device of claim 10, wherein the processor is configured to determine possible positionings of the input data and the output data from the layer based on the value in response to determining that additional memory cannot be added to the memory.

25. A method for determining an overall memory size of a global memory area to be allocated in a memory intended to store input data and output data from each layer of a neural network, the method comprising:
for each layer of the neural network, determining a value indicative of whether additional memory can be added to the memory, the value representing a size of the additional memory that can be added, and determining possible positionings of the input data and the output data from the layer based on the value; and
for each layer, determining an elementary memory size of an elementary memory area intended to store the input data and the output data from the layer based on a size of a selected positioning, the elementary memory size being in a range between a memory size for the input data or output data from the layer and a size equal to the sum of the memory size for the input data and the memory size for the output data from the layer, the overall memory size being determined based on the elementary memory sizes associated with the layers, the global memory area containing all the elementary memory areas, wherein the determining of the value for each layer and the possible positionings are performed prior to execution of the neural network.

26. A device, comprising:
an input configured to receive parameters defining various successive layers of a neural network; and
a processor coupled to the input and configured to determine an overall memory size of a global memory area to be allocated in a memory intended to store input data and output data from each layer of the neural network, the processor being configured to determine, for each layer, a value indicative of whether additional memory can be added to the memory, the value representing a size of the additional memory that can be added, possible positionings of the input data and the output data from the layer based on the value, and an elementary memory size of an elementary memory area intended to store the input data and the output data from the layer based on a size of a selected positioning, the elementary size being in a range between the memory size for the input data or the output data from the layer and a size equal to the sum of the memory size for the input data and the memory size for the output data from the layer, the overall memory size being determined based on elementary memory sizes associated with the layers, the global memory area being configured so as to contain all the elementary memory areas, wherein the determining of the value for each layer and the possible positionings are performed prior to execution of the neural network.

* * * * *